US008528839B2

(12) United States Patent
Bailey et al.

(10) Patent No.: US 8,528,839 B2
(45) Date of Patent: Sep. 10, 2013

(54) COMBUSTOR NOZZLE AND METHOD FOR FABRICATING THE COMBUSTOR NOZZLE

(75) Inventors: Donald Mark Bailey, Simpsonville, SC (US); William Lawrence Byrne, Simpsonville, SC (US); Patrick Benedict Melton, Horse Shoe, NC (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 13/009,108

(22) Filed: Jan. 19, 2011

(65) Prior Publication Data

US 2012/0181354 A1    Jul. 19, 2012

(51) Int. Cl.
*F02C 7/22*  (2006.01)
(52) U.S. Cl.
USPC ............... 239/405; 239/403; 60/737; 60/740
(58) Field of Classification Search
USPC ................. 239/399, 403, 405, 429–431, 463, 239/474, 475; 60/734, 737, 740, 742, 746–748
See application file for complete search history.

(56) References Cited

U.S. PATENT DOCUMENTS

| | | | |
|---|---|---|---|
| 6,363,724 B1 * | 4/2002 | Bechtel et al. | 60/737 |
| 6,438,961 B2 | 8/2002 | Tuthill et al. | |
| 6,698,207 B1 * | 3/2004 | Wiebe et al. | 60/737 |
| 6,993,916 B2 * | 2/2006 | Johnson et al. | 60/776 |
| 7,007,477 B2 * | 3/2006 | Widener | 60/737 |
| 7,360,991 B2 | 4/2008 | Ford et al. | |
| 2005/0039458 A1 | 2/2005 | Leen et al. | |
| 2006/0010878 A1 * | 1/2006 | Widener | 60/776 |
| 2006/0191268 A1 * | 8/2006 | Widener et al. | 60/772 |
| 2007/0214790 A1 * | 9/2007 | Bland | 60/734 |
| 2009/0056336 A1 * | 3/2009 | Chila et al. | 60/737 |
| 2009/0183511 A1 * | 7/2009 | Dinu | 60/737 |
| 2009/0223054 A1 | 9/2009 | Nyberg, II et al. | |

* cited by examiner

*Primary Examiner* — Darren W Gorman
(74) *Attorney, Agent, or Firm* — Dority & Manning, PA

(57) ABSTRACT

A combustor nozzle includes a single-piece swirler. The single-piece swirler includes a center body extending axially along the single-piece swirler, a first fuel passage inside the center body, and a plurality of vanes extending radially from the center body. A method for fabricating a combustor nozzle includes casting a single-piece swirler having a center body and a plurality of vanes extending radially from the center body.

16 Claims, 6 Drawing Sheets

COMBUSTOR NOZZLE AND METHOD FOR FABRICATING THE COMBUSTOR NOZZLE

FIELD OF THE INVENTION

The present invention generally involves a combustor nozzle and method for fabricating the combustor nozzle.

BACKGROUND OF THE INVENTION

Combustors are known in the art for igniting fuel with air to produce combustion gases having a high temperature and pressure. For example, gas turbine systems, aircraft engines, and numerous other combustion-based systems include one or more combustors that mix a working fluid, such as air, with fuel and ignite the mixture to produce high temperature and pressure combustion gases. Each combustor generally includes one or more nozzles that mix the working fluid with the fuel prior to combustion. If the fuel and air are not evenly mixed prior to combustion, localized hot spots may form in the combustor. The localized hot spots may increase the production of undesirable NOx emissions and may increase the chance for the flame in the combustor to flash back into the nozzles and/or become attached inside the nozzles which may damage the nozzles. Although flame flash back and flame holding may occur with any fuel, they occur more readily with high reactive fuels, such as hydrogen, that have a higher burning rate and a wider flammability range.

It is widely known that the thermodynamic efficiency of a combustion-based system generally increases as the operating temperature, namely the combustion gas temperature, increases. A variety of techniques exist to allow higher operating temperatures while minimizing NOx emissions, flash back, and flame holding. Many of these techniques seek to reduce localized hot spots to reduce the production of NOx and/or reduce low flow zones to reduce and/or prevent the occurrence of flash back or flame holding. For example, continuous improvements in nozzle designs result in more uniform mixing of the fuel and air prior to combustion to reduce or prevent localized hot spots from forming in the combustor. Alternately, or in addition, nozzles have been designed to ensure a minimum flow rate of fuel and/or air through the nozzle to cool the nozzle surfaces and/or prevent the combustor flame from flashing back into the nozzle.

Improved nozzle designs, however, may result in increased manufacturing, maintenance, and repair costs. For example, improved nozzle designs that incorporate multiple fuel channels, swirlers, and fuel injectors typically increase the number of braze and/or weld joints in the nozzle. These joints are relatively expensive to produce and require increased inspections and repairs. Therefore, an improved nozzle design that reduces or eliminates braze joints in the nozzle would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor nozzle that includes a single-piece swirler. The single-piece swirler includes a center body extending axially along the single-piece swirler, a first fuel passage inside the center body, and a plurality of vanes extending radially from the center body.

Another embodiment is a combustor nozzle that includes a single-piece swirler. The single-piece swirler includes a center body configured to receive a flow of fuel, a plurality of vanes extending radially from the center body, and a shroud circumferentially surrounding at least a portion of the plurality of vanes.

Embodiments of the present invention may also include a method for fabricating a combustor nozzle. The method includes casting a single-piece swirler having a center body and a plurality of vanes extending radially from the center body.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
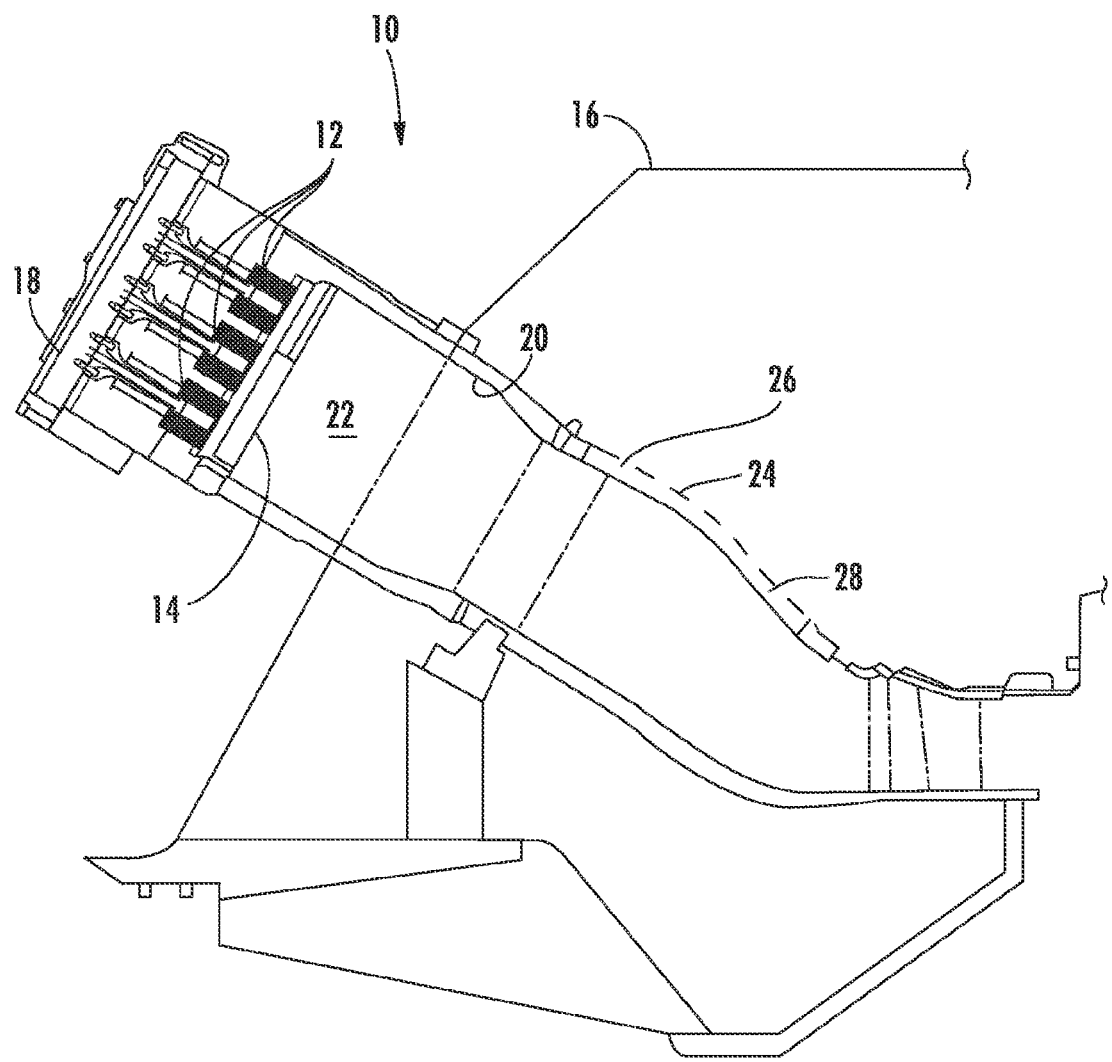
FIG. 1 is a simplified cross-section view of a combustor according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a simplified cross-section of a combustor 10 according to one embodiment of the present invention. As shown, the combustor 10 may include one or more nozzles 12 radially arranged in a top cap 14. A casing 16 may surround the combustor 10 to contain the air or compressed working fluid exiting the compressor (not shown). An end cap 18 and a liner 20 generally surround a combustion chamber 22 downstream of the nozzles 12. A flow sleeve 24 with flow holes 26 may surround the liner 20 to define an annular passage 28 between the flow sleeve 24 and the liner 20. As used herein, the terms "holes", "apertures", "ports", and "passages" are intended to be substantially identical in meaning and may be used as synonyms for one another. The compressed working fluid may pass through the flow holes 26 in the flow sleeve 24 to flow along the outside of the liner 20 to provide film or convective cooling to the liner 20. The compressed working fluid then reverses direction to flow through the one or more nozzles 12 where it mixes with fuel before igniting in the combustion chamber 22 to produce combustion gases having a high temperature and pressure.

Figure 2:
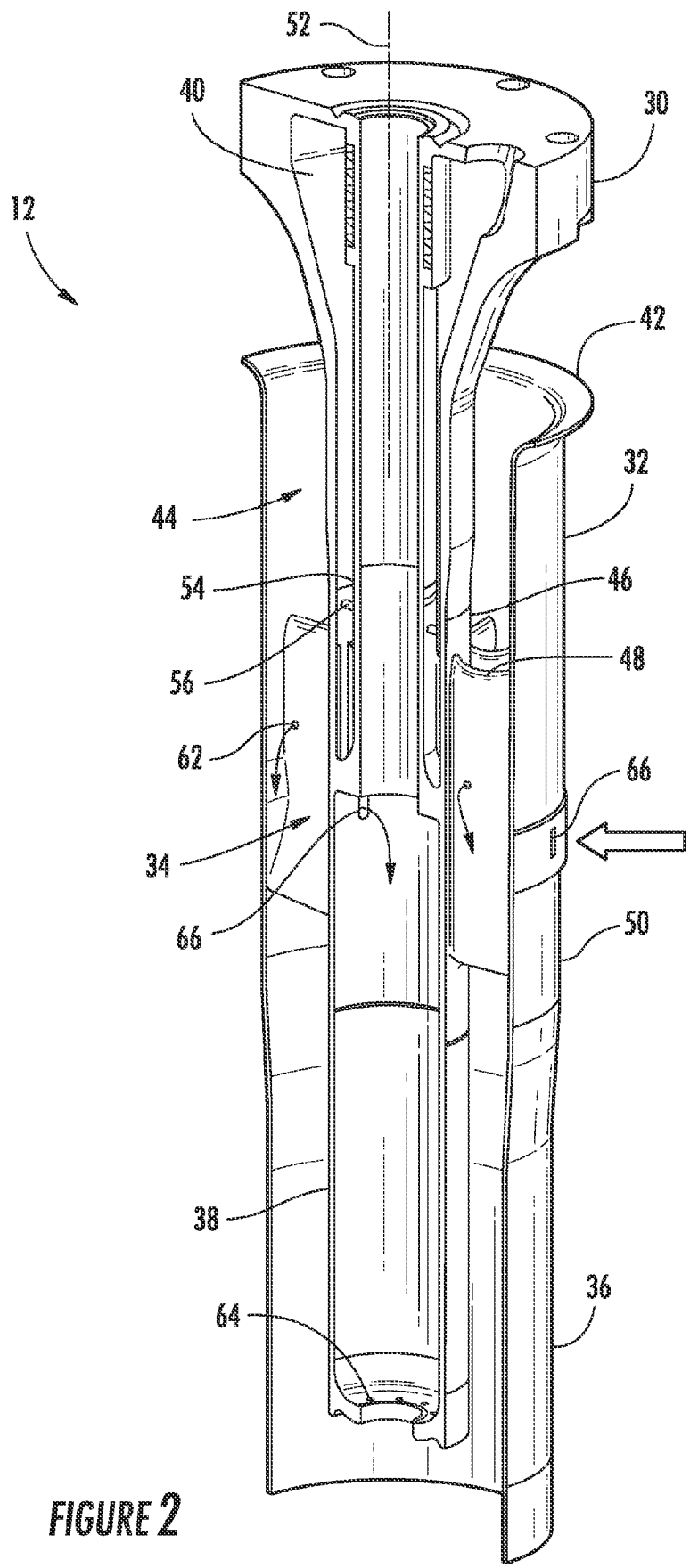
FIG. 2 is a perspective cut-away view of a nozzle according to one embodiment of the present invention.
Figure 3:
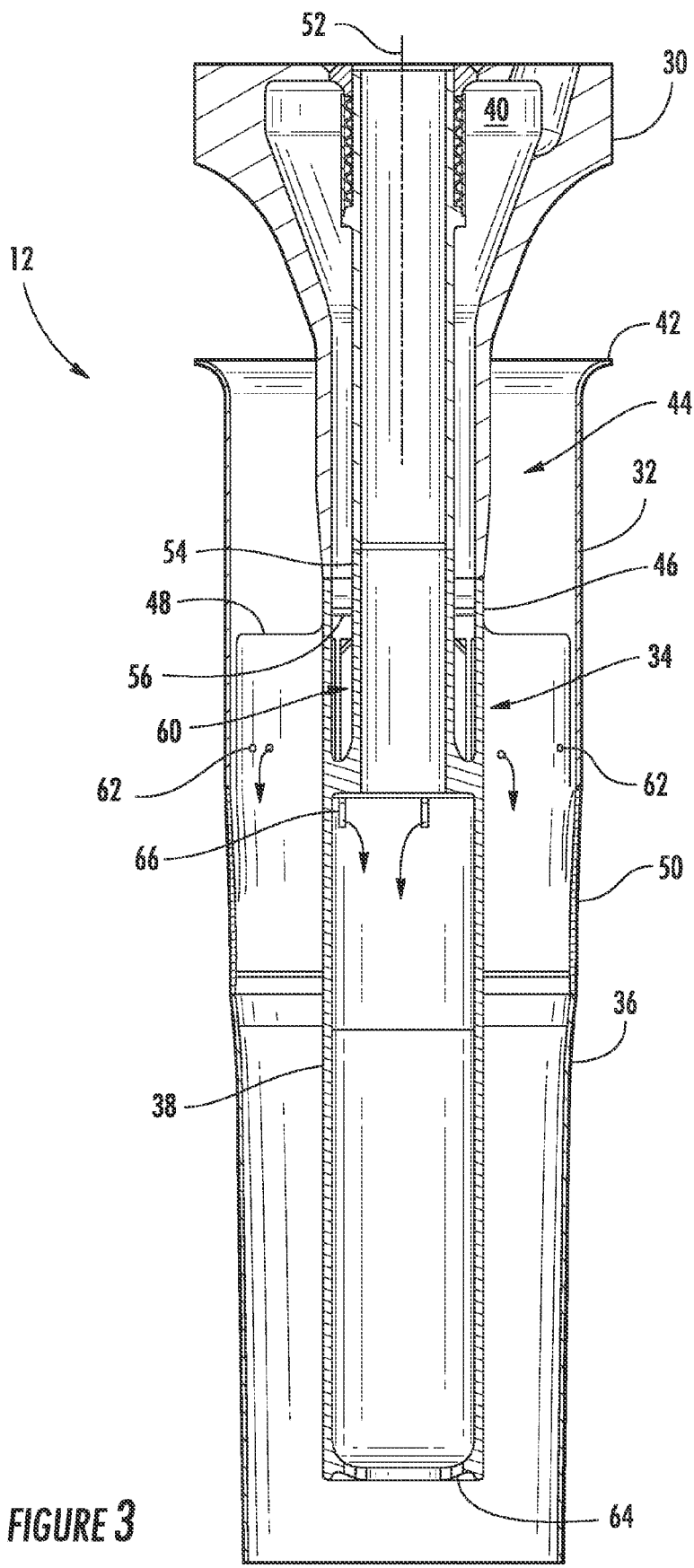
FIG. 3 is a plan view of the nozzle shown in FIG. 2.

FIG. 2 shows a perspective cut-away view and FIG. 3 shows a side cross-section view of the nozzle 12 according to one embodiment of the present invention. As shown in FIGS. 2 and 3, the nozzle 12 may comprise a flange 30, an inlet flow conditioner 32, a single-piece swirler 34, a burner tube 36, and a diffusion nozzle 38. The flange 30 may be bolted or otherwise attached to the end cap 18 at one end and welded, bolted, or otherwise connected upstream of the single-piece swirler 34 at the other end. Internal passages 40 inside the flange 30 provide fluid communication between the end cap 18 and the single-piece swirler 34. The flange 30 may be constructed from steel or steel alloys capable of withstanding the expected temperatures and may be annularly or conically shaped to reduce the flow resistance as the compressed working fluid flows around the flange 30 and into the inlet flow conditioner 32.

The inlet flow conditioner 32 may circumferentially surround at least a portion of the flange 30 and/or single-piece swirler 34 to improve the velocity distribution of the compressed working fluid as it flows through or across the single-piece swirler 34. The inlet flow conditioner 32 may comprise a perforated screen and/or one or more flow guides. Alternately, or in addition, as shown in FIGS. 2 and 3, the inlet flow conditioner 32 may comprise an annular sleeve 32 with a bell mouth opening 42, and the annular sleeve 32 may define a flow passage 44 between the flange 30 and/or the single-piece swirler 34 and the annular sleeve 32.

Figure 4:
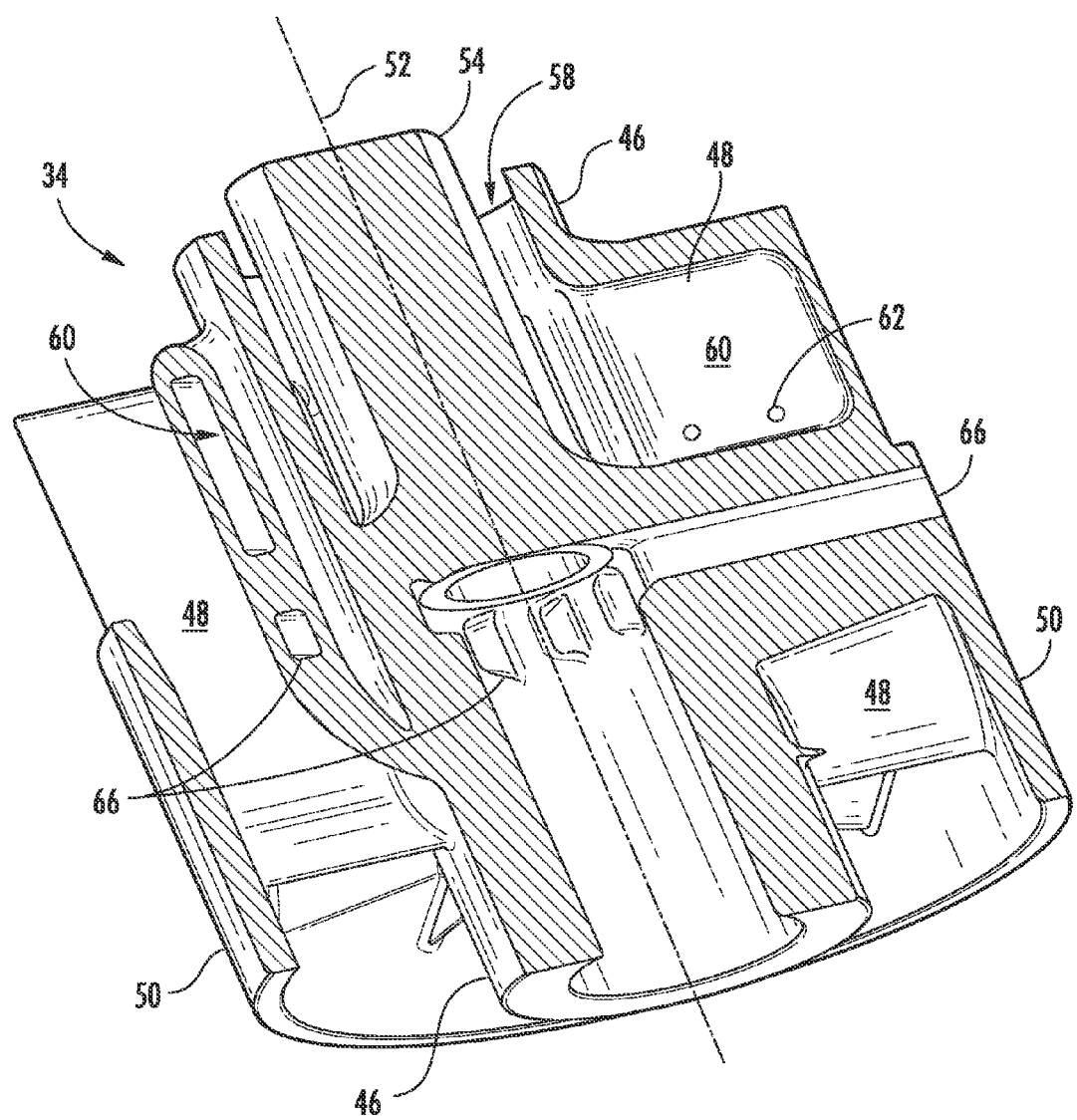
FIG. 4 is a perspective cut-away view of the single-piece swirler shown in FIGS. 2 and 3.

FIG. 4 provides a perspective cut-away of the single-piece swirler 34 shown in FIGS. 2 and 3. As shown, the single-piece swirler 34 is a unitary or one-piece component that may be forged or cast from steel or steel alloys capable of withstanding the expected temperatures. The single-piece swirler 34 generally comprises a center body 46, a plurality of vanes 48, and/or a shroud 50. The center body 46 generally comprises a plenum or annular tube 46 aligned with and extending along an axial centerline 52 of the nozzle 12 to provide fluid communication through the single-piece swirler 34. As shown in FIGS. 2-4, the single-piece swirler 34 may further include a tube 54 inside at least a portion of the center body 46 and at least one support 56 (not shown in FIG. 4) extending radially between the tube 54 and the center body 46. In this manner, the tube 54 defines an annular space 58 between the tube 54 and the center body 46 to allow a fluid, such as fuel, a diluent, or the compressed working fluid, to readily flow through the single-piece swirler 34.

The plurality of vanes 48 may extend radially from the center body 46 and may comprise curved or angled blades that impart tangential velocity to the fuel and/or compressed working fluid flowing over the vanes 48. As further shown in FIGS. 2-4, fuel passages 60 through the center body 46 and the vanes 48 may provide fluid communication for fuel to be distributed through metering ports 62 in the vanes 48. The metering ports 62 may be on one or both sides of the vanes 48 and/or at the tip of the vanes 48. Fuel may thus be supplied through the internal passages 40 in the flange 30, through the annular space 58 in the center body 46, through the fuel passages 60, and out of the metering ports 62 in the vanes 48. In this manner, the compressed working fluid may flow through the flow passage 44 and mix with fuel injected into the flow passage 44 from the metering ports 62 in the vanes 48.

The shroud 50 circumferentially surrounds at least a portion of the center body 46 and/or vanes 48 so that the flow passage 44 may extend axially through the single-piece swirler 34. As a result, the shroud 50 may contain and guide the mixture of fuel and compressed working fluid flowing through the flow passage 44 and over the vanes 48.

As shown in FIGS. 2 and 3, the burner tube 36 circumferentially surrounds at least a portion of the diffusion nozzle 38 and/or single-piece swirler 34 to contain and guide the mixture of fuel and compressed working fluid flowing through the nozzle 12. The burner tube 36 may be welded, bolted, or otherwise connected to the single-piece swirler 34 and may extend axially downstream of the single-piece swirler 34.

The diffusion nozzle 38 provides fluid communication for fuel and/or compressed working fluid to flow from the single-piece swirler 34 through the nozzle 12. As shown in FIGS. 2 and 3, the diffusion nozzle 38 may comprise a plenum or annular tube 38 with fuel ports 64 at the downstream end. The diffusion nozzle 38 may be centrally located within the burner tube 36 and may be connected to and extend downstream from the single-piece swirler 34. Specifically, the diffusion nozzle 38 may be welded, bolted, or otherwise connected to the tube 54 and/or center body 46, as shown in FIGS. 2 and 3. Fuel may thus flow through the flange 30, through the tube 54 inside the center body 46, and through the fuel ports 64 in the diffusion nozzle 38. In addition, a continuous passage 66 through the shroud 50, vanes 48, and center body 46 may allow the compressed working fluid to flow through the single-piece swirler 34 to dilute fuel flowing through the tube 54 in the center body 46 before flowing out of the diffusion nozzle 38.

Figure 5:
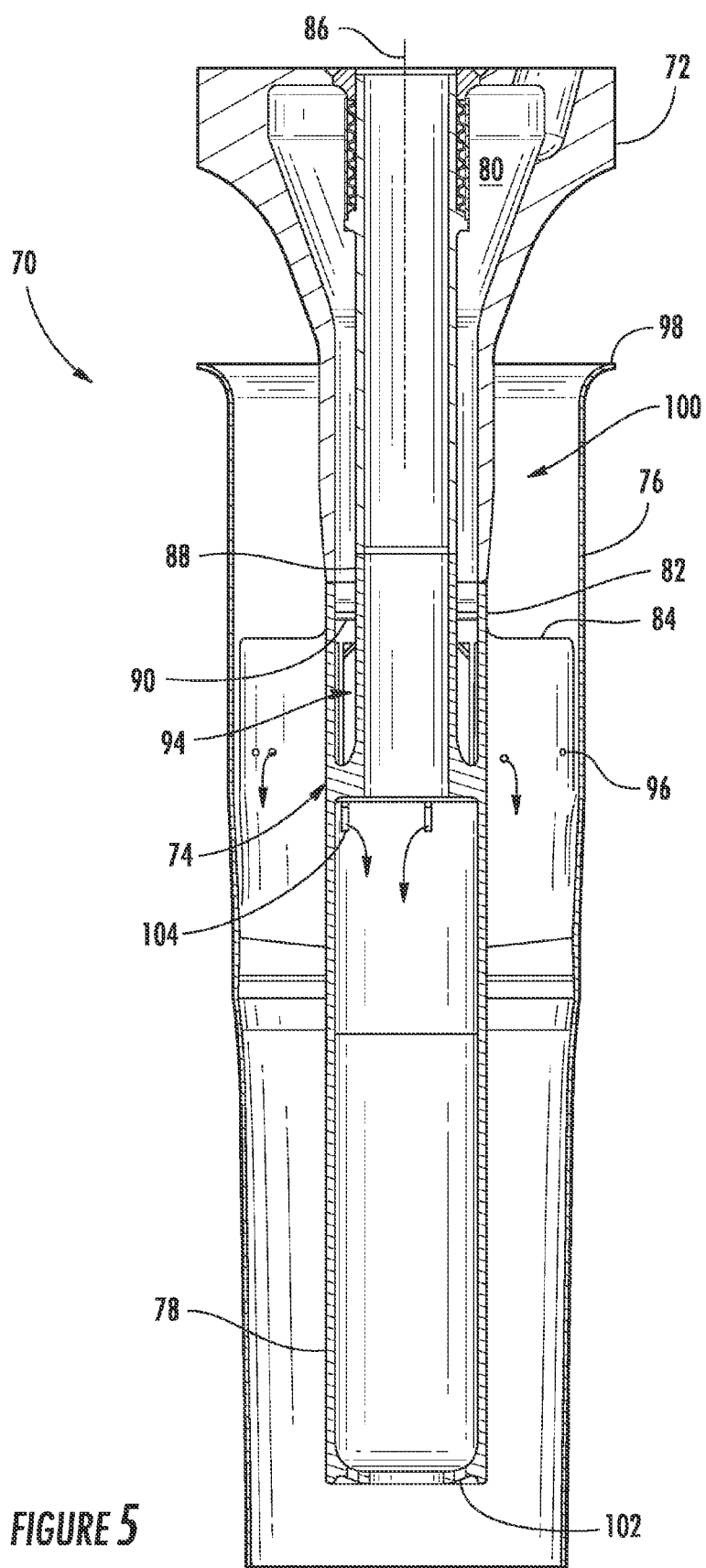
FIG. 5 is a plan view of a nozzle according to an alternate embodiment of the present invention.

FIG. 5 shows a side cross-section view of a nozzle 70 according to an alternate embodiment of the present invention. In this particular embodiment, the nozzle 70 generally comprises a flange 72, a single-piece swirler 74, a shroud 76, and a diffusion nozzle 78. The flange 72 may be bolted or otherwise attached to the end cap 18 at one end and welded, bolted, or otherwise connected upstream of the single-piece swirler 74 at the other end. Internal passages 80 inside the flange 72 again provide fluid communication between the end cap 18 and the single-piece swirler 74. The flange 72 may be constructed from steel or steel alloys capable of withstanding the expected temperatures and may be annularly or conically shaped to reduce the flow resistance as the compressed working fluid flows around the flange 72 and into the shroud 76.

Figure 6:
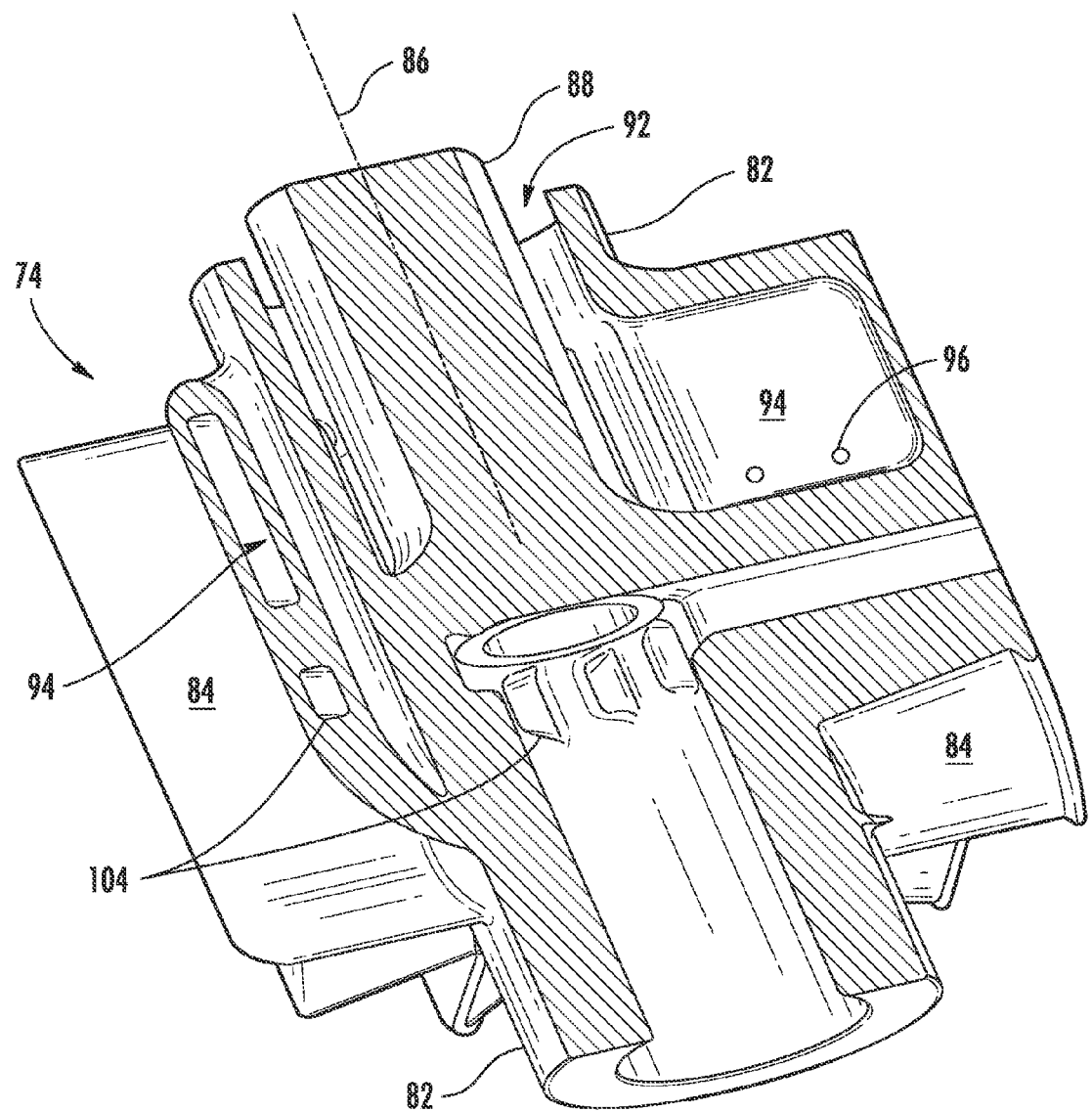
FIG. 6 is a perspective cut-away view of the single-piece swirler shown in FIG. 5.

FIG. 6 provides a perspective cut-away of the single-piece swirler 74 shown in FIG. 5. As shown, the single-piece swirler 74 is again a unitary or one-piece component that may be forged or cast from steel or steel alloys capable of withstanding the expected temperatures. In this particular embodiment, the single-piece swirler 74 generally comprises a center body 82 and a plurality of vanes 84, as previously described with respect to the embodiment shown in FIG. 4. Specifically, the center body 82 generally comprises a plenum or annular tube 82 aligned with and extending along an axial centerline 86 of the nozzle 70 to provide fluid communication through the single-piece swirler 74. As shown in FIGS. 5 and 6, the single-piece swirler 74 may further include a tube 88 inside at least a portion of the center body 82 and at least one support 90 (not shown in FIG. 6) extending radially between the tube 88 and the center body 82. In this manner, the tube 88 defines an annular space 92 between the tube 88 and the center body 82 to allow a fluid, such as fuel, a diluent, or the compressed working fluid, to readily flow through the single-piece swirler 74.

The plurality of vanes 84 may extend radially from the center body 82 and may comprise curved or angled blades that impart tangential velocity to fuel and/or compressed working fluid flowing over the vanes 84. As further shown in FIGS. 5 and 6, fuel passages 94 through the center body 82 and the vanes 84 may provide fluid communication for fuel to be distributed through metering ports 96 in the vanes 84. The metering ports 96 may be on one or both sides of the vanes 84 and/or at the tip of the vanes 84. Fuel may thus be supplied through the internal passages 80 in the flange 72, through the annular space 92 in the center body 82, through the fuel passages 94, and out of the metering ports 96 in the vanes 84.

In the embodiment shown in FIGS. 5 and 6, the shroud 76 is a separate component from the single-piece swirler 74, and the shroud 76 performs the functions provided by the inlet flow channel 32, shroud 50, and burner tube 36 previously described with respect to the embodiment shown in FIGS. 2-4. Specifically, the shroud 76 may be welded, bolted, or otherwise connected to the single-piece swirler 74 and may extend upstream and/or downstream of the single-piece swirler 74. Upstream of the single-piece swirler 74, the shroud 76 may comprise an annular sleeve 76 with a bell mouth opening 98 that circumferentially surrounds at least a portion of the flange 72 and/or single-piece swirler 74 to improve the velocity distribution of the compressed working fluid as it flows through or across the single-piece swirler 74. The annular sleeve 76 may define a flow passage 100 between the flange 72 and/or the single-piece swirler 74 and the annular sleeve 76, and the compressed working fluid may flow through the flow passage 100 and mix with fuel injected into the flow passage 100 from the metering ports 96 in the vanes 84.

Along the axial length of the single-piece swirler 74, the shroud 76 may circumferentially surround at least a portion of the center body 82 and/or vanes 84 so that the flow passage 100 may extend axially through the single-piece swirler 74. As a result, the shroud 76 may contain and guide the mixture of fuel and compressed working fluid flowing through the flow passage 100 and over the vanes 84. Downstream of the single-piece swirler 74, the shroud 76 may circumferentially surround at least a portion of the diffusion nozzle 78 and/or single-piece swirler 74 to contain and guide the mixture of fuel and compressed working fluid flowing through the nozzle 70.

The diffusion nozzle 78 provides fluid communication for fuel and/or compressed working fluid to flow from the single-piece swirler 74 through the nozzle 70. As shown in FIG. 5, the diffusion nozzle 78 may comprise a plenum or annular tube 78 with fuel ports 102 at the downstream end. The diffusion nozzle 78 may be centrally located within the shroud 76 and may be connected to and extend downstream from the single-piece swirler 74. Specifically, the diffusion nozzle 78 may be welded, bolted, or otherwise connected to the tube 88 and/or center body 82, as shown in FIG. 5. Fuel may thus flow through the flange 72, through the tube 88 inside the center body 82, and through the fuel ports 102 in the diffusion nozzle 78. In addition, a continuous passage 104 through the shroud 76, vanes 84, and center body 82 may allow compressed working fluid to flow through the single-piece swirler 74 to dilute the fuel flow through the nozzle 70 before exiting the diffusion nozzle 78 through the fuel ports 102.

The embodiments previously described and illustrated in FIGS. 2-6 may provide a method for fabricating a combustor nozzle 12, 70. Specifically, the method may comprise casting the single-piece swirler 34, 74 having the center body 46, 82 and the plurality of vanes 48, 84 extending radially from the center body 46, 82. In particular embodiments, the single-piece swirler 48 may also include the shroud 50, as shown in FIG. 4. The method may further include connecting the annular flange 30, 72 to the single-piece swirler 34, 74 upstream of the center body 46, 82 and/or connecting the shroud 76 and/or burner tube 36 circumferentially around at least a portion of the plurality of vanes 48, 84. In this manner, the method eliminates braze joints from the single-piece swirler 34, 74, improving durability and reducing the complexity of the combustor nozzle 12, 70 design.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor nozzle comprising:
    a. a single-piece swirler, wherein the single-piece swirler comprises
        i. a center body extending axially along the single-piece swirler;
        ii. a first fuel passage inside the center body; and
        iii. a plurality of vanes extending radially from the center body;
    b. a shroud circumferentially surrounding at least a portion of the single-piece swirler; and
    c. a continuous passage through the shroud and the plurality of vanes into the center body.

2. The combustor nozzle as in claim 1, wherein the single-piece swirler further comprises a tube inside at least a portion of the center body, wherein the tube defines a second fuel passage between the tube and the center body.

3. The combustor nozzle as in claim 2, wherein the single-piece swirler further comprises at least one support extending radially between the tube and the center body.

4. The combustor nozzle as in claim 2, wherein the second fuel passage extends through the center body and the plurality of vanes.

5. The combustor nozzle as in claim 1, wherein the shroud extends axially upstream of the single-piece swirler and axially downstream of the single-piece swirler.

6. The combustor nozzle as in claim 1, wherein the shroud comprises a bell mouth opening at one end.

7. The combustor nozzle as in claim 1, further comprising an annular flange connected upstream of the single-piece swirler.

8. A combustor nozzle comprising:
    a. a single-piece swirler, wherein the single-piece swirler comprises
        i. a center body configured to receive a flow of fuel;
        ii. a plurality of vanes extending radially from the center body;
        iii. a shroud circumferentially surrounding at least a portion of the plurality of vanes; and
        iv. a continuous passage through the shroud, the plurality of vanes, and the center body.

9. The combustor nozzle as in claim 8, wherein the single-piece swirler further comprises a tube inside at least a portion of the center body, wherein the tube defines a fuel passage between the tube and the center body.

10. The combustor nozzle as in claim 9, wherein the single-piece swirler further comprises at least one support extending radially between the tube and the center body.

11. The combustor nozzle as in claim 8, wherein the single-piece swirler further comprises a fuel passage through the center body and the plurality of vanes.

12. The combustor nozzle as in claim 8, further comprising an annular sleeve circumferentially surrounding at least a portion of the single-piece swirler and connected upstream of the single-piece swirler.

13. The combustor nozzle as in claim 8, further comprising an annular flange connected upstream of the single-piece swirler.

14. The combustor nozzle as in claim 8, further comprising a burner tube connected downstream of the single-piece swirler.

15. A method for fabricating a combustor nozzle comprising:
   a. casting a single-piece swirler, wherein the single-piece swirler comprises a center body, a plurality of vanes extending radially from the center body, a shroud circumferentially surrounding at least a portion of the plurality of vanes, and a continuous passage through the shroud, the plurality of vanes, and the center body.

16. The method as in claim 15, further comprising connecting an annular flange upstream of the single-piece swirler.

* * * * *